United States Patent [19]

Mowill

[11] Patent Number: 5,081,832
[45] Date of Patent: Jan. 21, 1992

[54] HIGH EFFICIENCY, TWIN SPOOL, RADIAL-HIGH PRESSURE, GAS TURBINE ENGINE

[75] Inventor: Rolf J. Mowill, Rugdeveien 7, 0386 Oslo, 3, Norway

[73] Assignee: Rolf Jan Mowill, Oslo, Norway

[21] Appl. No.: 724,476

[22] Filed: Jun. 28, 1991

Related U.S. Application Data

[63] Continuation of Ser. No. 488,138, Mar. 5, 1990, abandoned.
[51] Int. Cl.$^5$ .............................................. F02C 3/05
[52] U.S. Cl. ................................. 60/39.161; 60/39.36
[58] Field of Search ............... 60/39.161, 39.17, 39.36; 415/179

[56] References Cited

U.S. PATENT DOCUMENTS

| | | |
|---|---|---|
| 2,268,270 | 12/1941 | Traupel . |
| 2,469,238 | 5/1949 | Newton . |
| 2,487,514 | 11/1949 | Boestad et al. . |
| 2,488,969 | 11/1949 | Dietler . |
| 2,489,939 | 11/1949 | Traupel .......................... 60/39.161 |
| 2,513,601 | 7/1950 | Traupel . |
| 2,608,822 | 9/1952 | Pavlecka et al. ................. 60/39.161 |
| 2,621,475 | 12/1952 | Loy . |
| 2,625,012 | 1/1953 | Larrecq ........................... 60/39.161 |
| 2,663,141 | 12/1953 | Hage . |
| 2,675,673 | 4/1954 | Mallinson et al. .............. 60/39.161 |
| 2,988,884 | 6/1961 | Pouit . |
| 3,091,080 | 5/1963 | Crim et al. ...................... 60/39.161 |
| 3,204,406 | 9/1965 | Howes et al. . |
| 3,315,467 | 4/1967 | De Witt . |
| 3,765,170 | 10/1973 | Nakamura . |
| 4,030,288 | 6/1977 | Davis et al. . |
| 4,286,430 | 9/1981 | Smith ............................... 60/39.161 |
| 4,641,495 | 2/1987 | Mowill ............................ 60/726 |
| 4,845,944 | 7/1989 | Rodgers . |
| 4,893,466 | 1/1990 | Egnell et al. .................... 60/39.161 |

FOREIGN PATENT DOCUMENTS

| | | |
|---|---|---|
| 0247984 | 12/1987 | European Pat. Off. . |
| 748208 | 10/1944 | Fed. Rep. of Germany . |
| 833739 | 3/1952 | Fed. Rep. of Germany . |
| 2812237 | 10/1978 | Fed. Rep. of Germany . |
| 1246455 | 10/1960 | France . |
| 283198 | 5/1952 | Switzerland . |
| 668834 | 3/1952 | United Kingdom . |
| 720436 | 12/1954 | United Kingdom . |

OTHER PUBLICATIONS

Shepherd, D. G. *Principles of Turbomachinery.* New York: The Macmillan Co., 1956, pp. 282-289.
Csanady, G. T. *Turbomachines* New York: McGraw-Hill Book Co., 1964, pp. 14-23.
Cox, H. R., "Gas Turbine Principles and Practice," Van Nostrand, pp. 2-26 1955.
Traegor, E. E., "Aircraft GAs Turbine Technology", p. 10, 1970.

*Primary Examiner*—Richard A. Bertsch
*Assistant Examiner*—Timothy S. Thorpe
*Attorney, Agent, or Firm*—Finnegan, Henderson, Farabow, Garret & Dunner

[57] ABSTRACT

A low cost, low fuel consumption, twin-spool turbine engine with external power take-off essentially exclusively from the high pressure (H.P.) spool uses a radial in-flow turbine and a centrifugal compressor in the H.P. spool and a flow-optimized L.P. spool to achieve pressure ratios above 12/1 for simple cycle engines. Intercooled and recuperated versions are included. The turbine engine according to this invention is ideally suited for applications up to about 1000 KW and will provide some 20% less fuel consumption in this power range compared with conventional designs.

18 Claims, 4 Drawing Sheets

HIGH EFFICIENCY, TWIN SPOOL, RADIAL-HIGH PRESSURE, GAS TURBINE ENGINE

This application is a continuation of application Ser. No. 07/488,138, filed Mar. 5, 1990 now abandoned.

BACKGROUND OF THE INVENTION

This invention relates to gas turbine engines using radial turbines and centrifugal compressors in high pressure engine portion and arranged so as to achieve low fuel consumption.

Up till now the reduction in fuel consumption in smaller gas turbine engines has been limited by the difficulty in obtaining high pressure ratio, cooling small turbine components, and avoiding parasitic losses resulting from scaled down components, and by the high cost of miniature precision parts. Had it not been for the reasons given, small turbine engines would have seen an extended use generally, particularly because of the ability of such engines to operate with substantially lower emissions than gas engines, diesel engines and gasoline engines.

Many previous attempts have been made to solve the above problems, but the only other solution which addresses the situation uses a double entry first stage compressor in a single spool gas generator configuration. This configuration holds promise in the higher power range, but would be far too expensive for use in the lower power range, i.e. $\leq$ about 1000 KW.

SUMMARY OF THE INVENTION

As a consequence of the above mentioned shortcomings in conventional and known gas turbine engine designs, it is an object of the present invention to provide highly efficient gas turbine engines for use in the lower power ranges where fuel consumption levels and first cost so far have not made them acceptable.

It is a further object of the present invention to provide a gas turbine engine construction having the flexibility to be utilized for varying operating conditions without penalizing design point performance.

In accordance with the present invention, as broadly disclosed and claimed herein, the high-efficiency, twin spool, gas turbine engine comprises a high pressure spool having shaft means, and specifically a centrifugal compressor and a radial in-flow turbine mounted on the shaft means, the radial in-flow turbine having an expansion ratio of about 4/1 to 8/1. Means are provided connected to the shaft means for driving an external load, and combustion means associated with the high pressure spool are provided for receiving compressed air from the centrifugal compressor, combusting fuel using the compressed air, and delivering the combustion gases to the radial in-flow turbine. The twin spool gas turbine also comprises a low pressure spool having shaft means and associated low pressure compressor means and low pressure turbine means, the low pressure spool being rotatably independent from the high pressure spool and being essentially load-free. Still further the twin gas spool-turbine comprises first means for flow interconnecting the low pressure compressor means and the high pressure centrifugal compressor for supplying precompressed air thereto, and second means for flow interconnecting the high pressure radial in-flow turbine and the low pressure turbine means for supplying partially expanded combustion gases thereto.

Preferably the pressure ratio of the low pressure compressor is less than or equal to the pressure ratio of the high pressure centrifugal compressor, and the low pressure compressor is preferably, but not necessarily, a single entry centrifugal compressor and the low pressure turbine can be an axial, radial or a mixed axial/radial flow turbine. The design load deliverable by the external load driving means is preferably $\leq$ about 1000 KW.

The twin spool gas turbine engine may include intercooler means associated with the first flow interconnecting means for cooling said pre-compressed air. Preferably the first flow interconnecting means includes diffuser means to receive and diffuse partially diffused compressed air received from the low pressure compressor means prior to delivering the air to the high pressure centrifugal compressor. Also, the first and second flow interconnecting means may structurally support and orient the first and second spools to be angularly offset from one another.

The twin spool gas turbine engine may further include recuperator means for extracting heat values from the combustion gases exhausted from the low pressure turbine and preheating the compressed air delivered from the high pressure centrifugal compressor prior to combustion, and the combustion means may include a low $NO_x$ combustor of the angled internal cone type.

The accompanying drawings, which are incorporated in and constitute a part of this specification, illustrate a preferred embodiment of the invention and, together with the description, serve to explain the principles of the invention.

BRIEF DESCRIPTION OF THE DRAWINGS

A better understanding of the present invention will be had upon reference to the following detailed description when read in conjunction with the accompanying drawings in which.

Reference will now be made to the present preferred embodiment of the invention which is illustrated in the accompanying drawing.

DESCRIPTION OF THE PREFERRED EMBODIMENT

Figure 1:
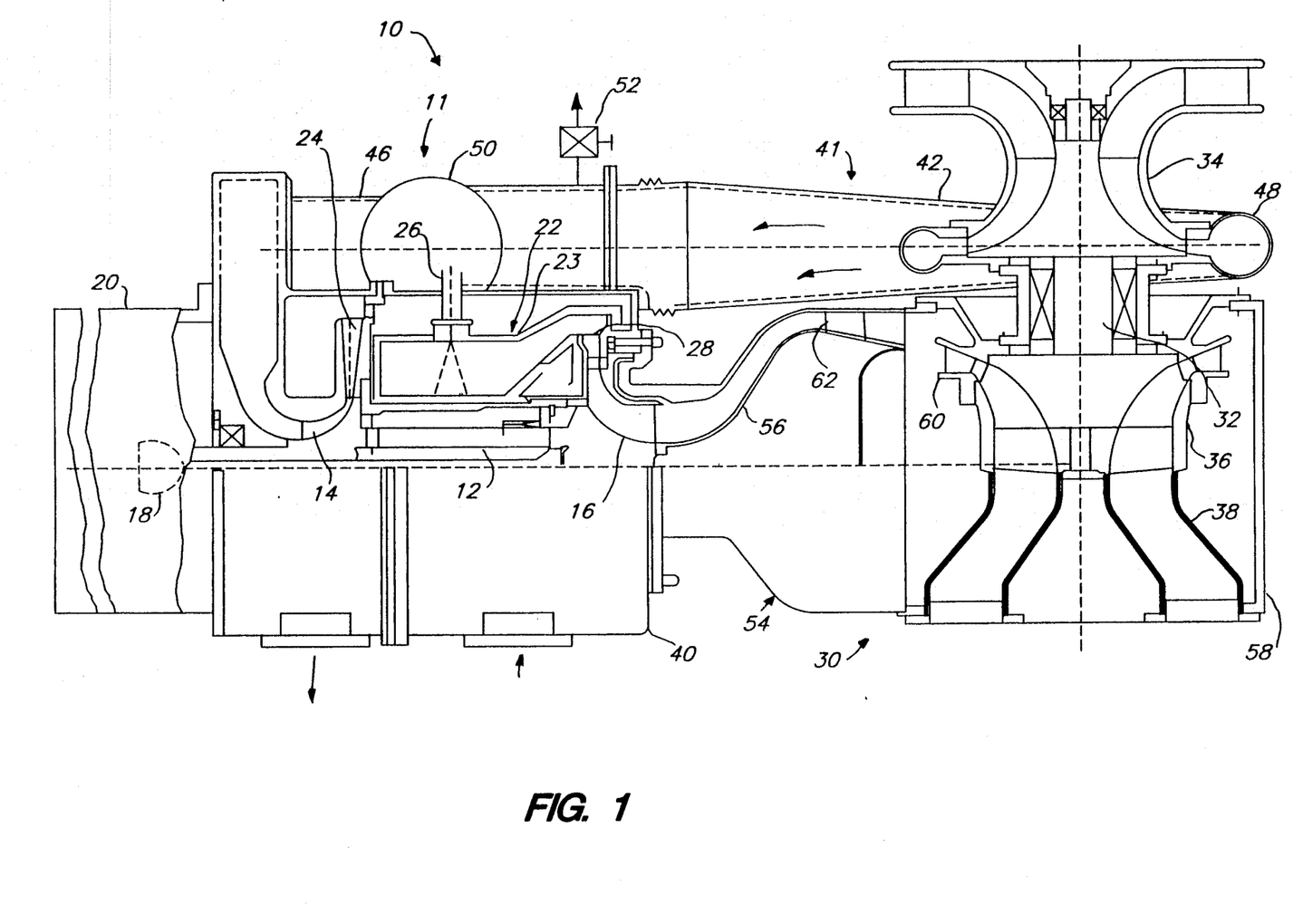
FIG. 1 is a plan cross-sectional view of one embodiment of the high efficiency twin spool, gas turbine engine according to the present invention.

With initial reference of FIG. 1 there is shown a preferred high efficiency, twin spool, gas turbine engine constructed in accordance with the present invention and designated generally by the numeral 10. Modifications and variations to the presently preferred embodiment depicted in FIG. 1 would be immediately evident to one skilled in the art after reading the detailed discussion below in conjunction with the accompaning drawing, and these modifications and variations are considered part of the present invention which is intended to be limited only by the appended claims and their equivalents.

In accordance with the present invention, the gas turbine engine includes a high pressure ("H.P.") spool having shaft means and characterized by a centrifugal compressor and especially a radial in-flow ("R.I.F.") turbine mounted on the shaft means. As embodied herein and with continued reference to FIG. 1, gas turbine 10 includes H.P spool 11 including shaft assembly 12, and with single entry centrifugal compressor 14 and R.I.F. turbine 16 mounted at opposite ends thereof. R.I.F. turbine 16 is configured to operate with an expansion ration of from about 4/1 to 8/1, and generally will have a rotor diameter of $\leq 500$ mm at load levels less than 1000 KW.

Further, in accordance with the invention, means connected to the shaft means are provided for driving an external load. As embodied herein, external load driving means is shown schematically at 18 connecting load 20 to H.P. spool shaft assembly 12 proximate H.P. compressor 14. Load 20 (which is also shown schematically) can be for instance a high speed electrical generator. Load driving means 18 can include gear reduction apparatus, clutches, etc. with related shafting. Driving means 18 can include means for driving the H.P. spool lubrication system, fuel delivery systems (both not shown) and other auxiliary systems of engine 10, although these systems are not considered part of the external load, or the auxiliary loads can be carried by the low pressure ("L.P.") spool to be discussed hereinafter, or shared between the H.P. spool and the L.P. spool.

Further in accordance with the present invention, combustion means are provided for receiving compressed air from the H.P. centrifugal compressor, combusting fuel using the compressed air, and delivering the combustion gases to the high pressure R.I.F. turbine. As embodied herein, and with continued reference to FIG. 1, gas turbine 10 includes combustion means 22 including combustor 23 which receives compressed air from H.P. centrifugal compressor diffuser 24 and fuel through conduit 26 from a fuel supply (not shown). Combustion gases exit combustor 23 and are delivered to the R.I.F. turbine inlet 28 for subsequent expansion. It is highly preferred that combustor 23 utilize the low $NO_x$ angled internal cone annular combustor configuration disclosed in the present inventor's copending application Ser. No. 07/488,136 filed concurrently herewith and entiled LOW EMISSIONS GAS TURBINE COMBUSTOR the disclosure of which is hereby incorporated by reference.

Still further in accordance with the present invention, the gas turbine includes a low pressure ("L.P.") spool having shaft means and associated L.P. compressor means and L.P. turbine means. As embodied herein, gas turbine 10 includes L.P. spool 30 having L.P. shaft assembly 32, with L.P. compressor 34 and L.P. turbine 36 mounted on opposite ends thereof. In the preferred embodiment L.P. compressor is shown as a centrifugal compressor and L.P. turbine as a mixed axial/radial turbine. Other configurations are possible, including using pure axial and pure radial compressor and turbine components.

Importantly L.P. spool shaft assembly 32 is rotatably independent from H.P. spool shaft assembly 12 such that it can operate at a variable speed, depending upon the power level, and hence mass flow requirements, of the operating conditions while allowing the H.P. spool 11 to continue to operate at essentially constant speed which is advantageous for constant frequency load demands. The H.P spool could also be used in a variable RPM application. At low power conditions, the L.P. spool would slow down lowering the energy consumption and thereby reduce efficiency-fall off.

Also, L.P. spool 30 is free from external loads. That is, the power extracted by L.P. turbine 36 is used solely to power L.P. compressor 34, and possibly to supply power to drive some or all of the engine auxiliary systems. As discussed previously, these auxiliary systems are not considered part of the external load which is driven solely by H.P. spool 11.

Also, L.P. spool preferably includes diffuser 38 for receiving and finally diffusing the combustion gases exhausted from L.P. turbine 36. As shown schematically in FIG. 1 and FIG. 2, gas turbine 10 can optionally include recuperator means 40 which can extract heat values from the diffused exhaust from L.P. turbine 36 and heat the compressed air from H.P. compressor 14 prior to admission to combustion means 22.

Further in adccordance with the invention, first and second flow interconnection means are provided. The first flow interconnection means channels the pre-compressed air from the L.P. compressor means to the H.P. centrifugal compressor, and the second flow interconnection means channels the partially expanded combustion gases from the H.P. radial in-flow turbine exit to the L.P. turbine inlet.

As embodied herein, first flow interconnection means 41 includes manifold 42 for collecting the pre-compressed air from L.P. compressor diffuser 44 and conduit 46 for carrying the collected pre-compressed air from manifold 42 to H.P. centrifugal compressor inlet plenum 48. Preferably, low pressure compressor diffuser 44 is configured to only partially diffuse the compressed high velocity air exiting low pressure compressor 34 to a higher pressure and lower velocity, and that collection manifold 42 is configured with an increasing cross-sectional flow area in the flow directions (shown by arrows) to accomplish further diffusion. Because the outer dimensions of the L.P. module can be influenced by the outer diameters of the L.P. compressor diffuser which depends, in turn, on the flow rate and average velocity, accomplishing part of the diffusion in manifold 42 of interconnecting means 41 can advantageously achieve a reduction in the engine space envelope.

Figure 2:
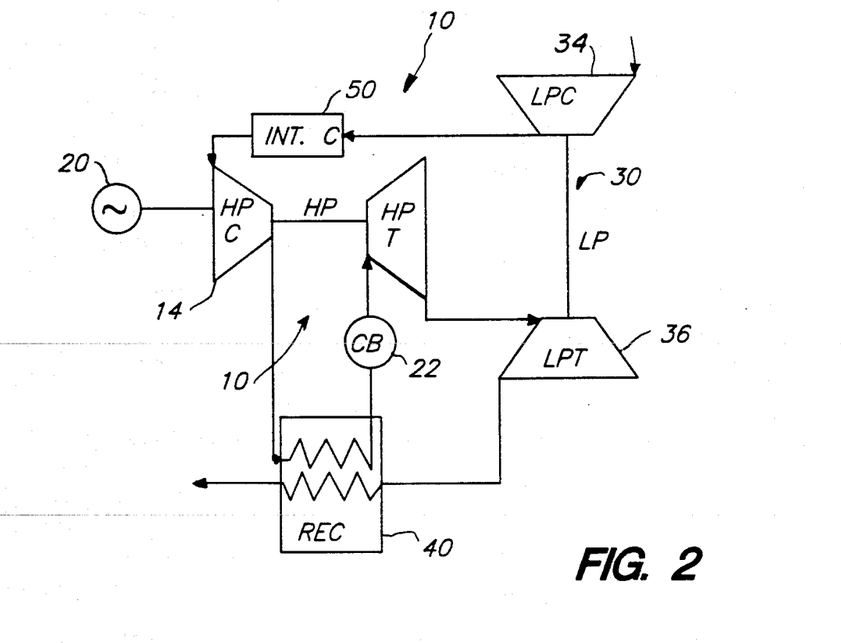
FIG. 2 is a schematic view of the gas turbine engine depicted in FIG. 1 but with intercooler and recuperator components shown.

Optionally, and as seen in FIGS. 1 and 2 FIG. 2, first flow interconnection means 41 can include intercooler 50 for increasing the density of the pre-compressed air prior to final compression by H.P. centrifugal compressor 14. For operation with intercooler 50, the pressure ratio of L.P. compressor 34 should be less than or equal to the pressure ratio of H.P. centrifugal compressor 14. Flow interconnection means 41 can also include bleed valve 52, shown connected to conduit 46 in FIG. 1, for use during start-up or other transient conditions.

As embodied herein, second flow interconnection means 54 includes diffuser 56 for diffusing the partially expanded combustion gases exiting H.P. turbine 16 and manifold 58 for distributing the diffused, partially expanded gases to the L.P. turbine inlet 60. In the preferred gas turbine engine 10, the L.P. spool pressure vessel is configured to provide manifold 58. Diffuser 56 preferably can include vanes 62 to eliminate swirl from H.P. radial turbine 16 exhaust.

First and second flow interconnection means 41 and 54 also structurally support and orient H.P. spool 12 to be angularly offset from L.P. spool 30. The offset shown in FIG. 1 is about 90° but other angles may be preferred depending upon the intended application, and even the zero offset angle configurations shown in FIGS. 3A and 3B. The 90° configuration shown in FIG. 1 minimizes heat and flow (form and friction) losses between the H.P. spool and L.P. spool and L.P. turbine to the atmosphere and is thus preferred from increased thermal efficiency considerations and mechanical convenience.

Figure 5:
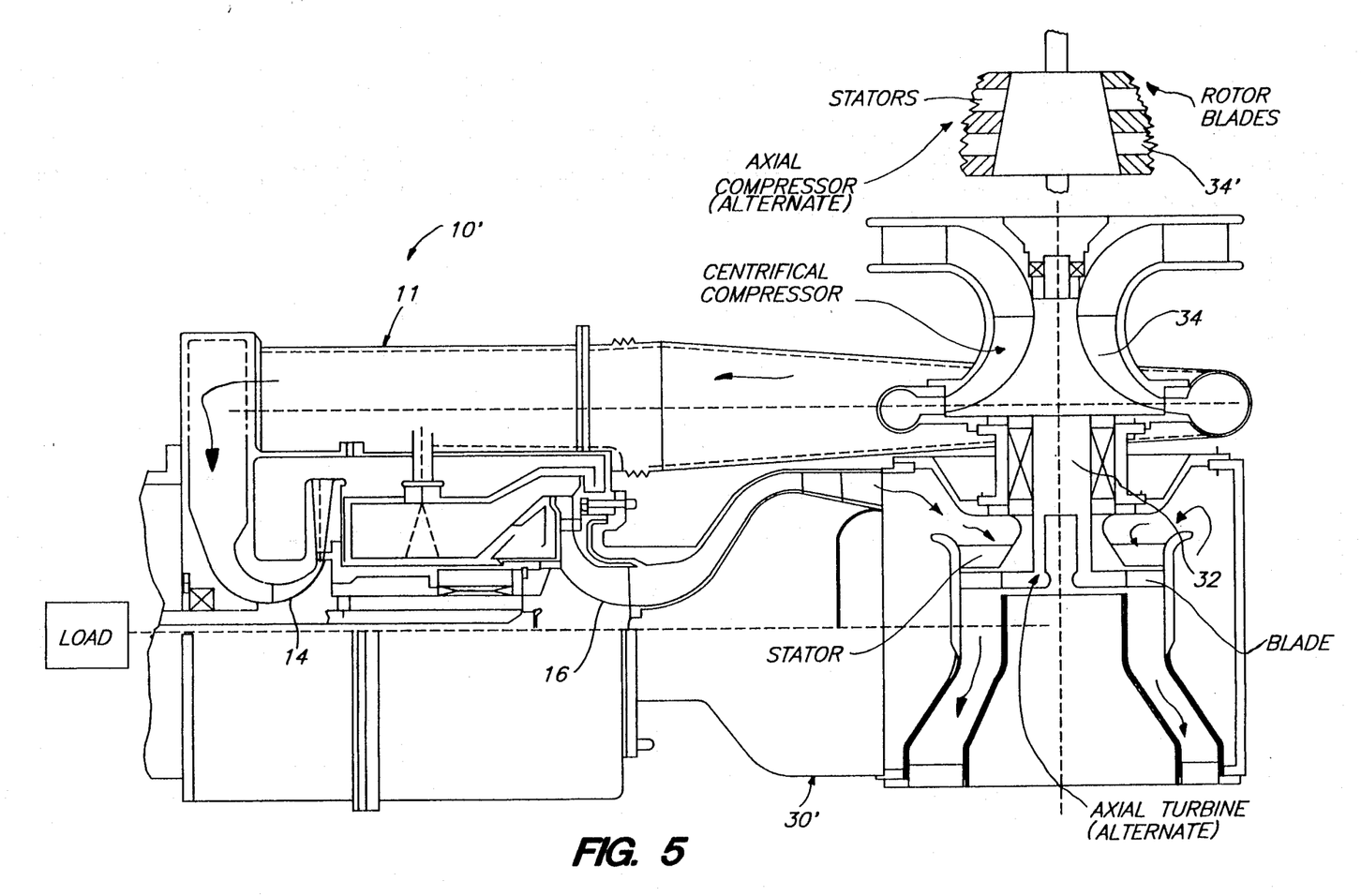
FIG. 5 is a plan cross-sectional view of variations of the gas turbine engine depicted in FIG. 1.

FIG. 5 shows several variations in the configuration of low pressure spool from that shown in FIG. 1. In FIG. 5, the low pressure spool (designated 30') of engine 10' includes low pressure turbine 36' which is configured as an axial turbine, compared to the mixed axial/radial turbine 36 shown in FIG. 1. Axial low pressure turbine 36' drives low pressure centrifugal compressor 34 via shaft assembly 32 in the FIG. 5 depiction. However, an axial compressor component such as axial compressor 34' (shown schematically in dotted lines) could be substituted for centrifugal compressor 34 in L.P. spool 30', in accordance with the present invention. Importantly, for all variations shown in FIG. 5 and described herein, H.P. spool 11 remains configured with a centrifugal compressor such as 14 and a radial in-flow turbine such as 16.

As is evident from the above description, the present invention relates to a gas turbine engine with two separate shafts each with associated compressor and dedicated turbine components. Contrary to conventional configurations, the power output is taken essentially exclusively from the high pressure part of the engine. This invention relates *only* to turbine engines where the high pressure turbine is of the radial type, where the high pressure compressor driven by the said radial turbine is a centrifugal compressor, and where the external load is driven by the H.P. spool. See FIG. 1.

The two shafts with their corresponding rotor components are called "spools." The high pressure spool therefore has a centrifugal compressor and a so-called radial in-flow turbine.

In the preferred embodiment, power is extracted from the compressor side of the H.P. spool, but a power take-off from the turbine side should also be considered within the scope of the invention as long as power is extracted from the H.P. spool.

The sole purpose of the L.P. spool is to absorb additional energy from the exhaust gas after it has expanded through the H.P. turbine and to use this energy to drive the compressor which is mounted on the same L.P. shaft. This compressor, in turn, provides compressed air (or other gaseous medium able to support combustion) to the second stage compressor so as to reach the designated overall pressure ratio for the engine through the use of both compressors, typically, about 20/1.

No external power will be extracted from the L.P. spool. Auxiliary drives, such as fuel and oil pumps, etc. are not considered as external power in the context of this invention and could be driven by the L.P. spool, the H.P. spool, or shared.

The purpose of the invention with the incorporation of a radial in-flow turbine as the driving component for both the H.P. compressor and the external load is to provide the maximum possible work for the radial in-flow turbine without exceeding the mechanical properties in the turbine caused by the resulting high peripheral speed of the turbine rotor. This higher peripheral speed is made possible because of the "Eiffel tower" profile of the radial turbine blade with a thick section in the hub-region and a thin, lighter section at the blade tips. An axial turbine does not have this feature and would, in contrast to a radial stage, also incur a large loss in efficiency at high expansion ratios. Also the resulting high peripheral speeds of the radial turbine lowers the blade temperature thus making blade cooling unnecessary at temperature levels where axials need it, an important feature for small turbine engines.

Reverting to FIG. 1, the flow path of the engine is described below: Air enters the low pressure compressor 34, is compressed and exits via manifold 42 into the transfer conduit 46 leading to the high pressure compressor 14. After having been further compressed by centrifugal compressor 14 the air enters the combustor 23 where it is burned with fuel added. The resulting hot gases are expanded through high pressure radial in-flow turbine 16, which in turn drives both the high pressure compressor 14 and the external load 20 via the shaft 12 and driving means 18. After the gases have passed the H.P. turbine 16, further exhaust energy is recovered in an exhaust diffuser 56, here shown as a radial type to remove "swirl" from the exhaust with minimum losses. In the preferred embodiment the L.P. shaft 32 and the H.P. shaft 12 are located at an angle with respect to each other (here shown as 90 degrees). The gases are only partly expanded in the H.P. turbine and enter the L.P. turbine via manifold 58. Following final expansion through L.P. turbine 36, shown in FIG. 1 as a "mixed flow" type, the gases are exhausted through diffuser 38.

The incorporation of intercooler and recuperator components in the flowpath such as intercooler 50 and recuperator 40 can be conveniently effected with a very minimum of changes, and thus achieve the arrangement described in FIG. 1 and FIG. 2. However the intercooler and recuperator components are not essential parts of the present invention.

Since the difference between the turbine inlet temperature (i.e. approximately the average combustor exit temperature) and the relative stagnation temperature for a typical radial turbine stage at the inlet will be nearly 50% of the total temperature drop over that expansion stage, a higher expansion ratio results in a lower turbine blade temperature. This feature allows higher cycle (combustor) temperatures to be utilized for increased thermal efficiencies.

The best state of the art radial turbine will provide good efficiencies up to about 8/1 expansion ratio. This would correspond to approximately the same pressure ratio for a single shaft radial engine. A simple cycle engine, i.e. an engine without recuperator or other cycle additions to increase thermal efficiency, will need substantially higher pressure ratios in order to achieve the best efficiencies for a given turbine inlet temperature of say, 1000° C. The current invention provides increased efficiency at the design point by utilizing a higher overall cycle pressure and, hence, improving shaft efficiency by means of the pre-compression generated by the L.P. spool.

According to the invention, the largest part of the expansion should be taken over the H.P. radial turbine in order to obtain the above mentioned effect of minimizing turbine blade temperatures for a given average combustion temperature. For about a 21/1 pressure ratio engine the expansion ratio over the H.P. turbine would be typically about 7/1 and over the L.P. turbine about 3/1. However, overall pressure ratios of between about 8/1 and 30/1 are contemplated, with the higher pressure ratios corresponding higher outputs. For power output in the range below 1000 KW, the over all pressure ratio will generally range between about 12/1 and 21/1.

Component efficiencies of centrifugal compressors and radial turbines are very dependent on Specific Speed. The term Specific Speed ($N_s$) defines the speed-flow-work relationship in a component and is described in U.S. Pat. No. 4,641,495 in conjunction with another engine configuration of the same inventor.

In conventional gas turbine engines with centrifugal and radial turbines, an acceptable $N_s$ is obtained either at the expense of pressure ratio, or by using a double entry first stage compressor in the gas generator, a configuration disclosed in U.S. Pat. No. 4,461,495. In such configurations, a separate power turbine must be used to take out external shaft power. This last arrangement is significantly more complicated than the current invention which is therefore more suitable for the lower power range.

The engine configuration described herein has two rotatably independent shafts which operate at different speeds so as to satisfy the requirement for an optimum specific speed for the high pressure spool wheels and at the same time provide the best possible flow conditions for the L.P. compressor and turbine.

The engine configuration according to the invention requires that the power output is taken from the high pressure spool which is also generally the highest rpm shaft. This feature could prove to be a minor disadvantage if a reduction gear is contemplated as part of load driving means 18, as a somewhat greater reduction ratio would be required. Compared with the significant advantage of being able to operate at a H.P. turbine inlet temperature of some 100° C. higher than an uncooled axial turbine can accept, this should not detract substantially from the value of the invention. Current developments in the field of direct driven high speed electric generators would fit ideally into an energy system with the above-described engine.

The torque characteristics of the engine configuration will be unique in that it will lie between a single shaft engine characteristic and the characteristic of an engine with a free power turbine. The reason for this is the nature of the above-described engine as a "boosted" single shaft machine.

Depending on the application a certain degree of variability in air flow would be required between and/or possibly within the two compressor and turbine stages. The simplest construction for accommodating for such variability takes the form of an interstage bleed, such as bleed means 52 shown in FIG. 1, to be activated during transients to help match the flow to the components.

Both a relatively high pressure cycle and a lower pressure ratio engine can be constructed according to this invention. The lower pressure ratio version would normally be equipped with a recuperator and an intercooler between the compressor stages. The two separate compressors and the construction of flow interconnecting means 41 make the adaptation of such components very convenient, see FIGS. 1 and 2.

Figure 3A:
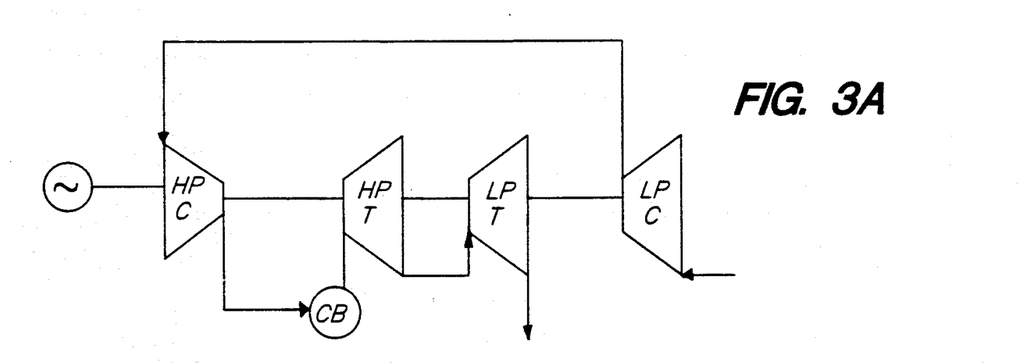
FIGS. 3A and 3B depict alternative in-line and parallel spool configurations, respectively, for the gas turbine engine shown in FIG. 1.
Figure 3B:
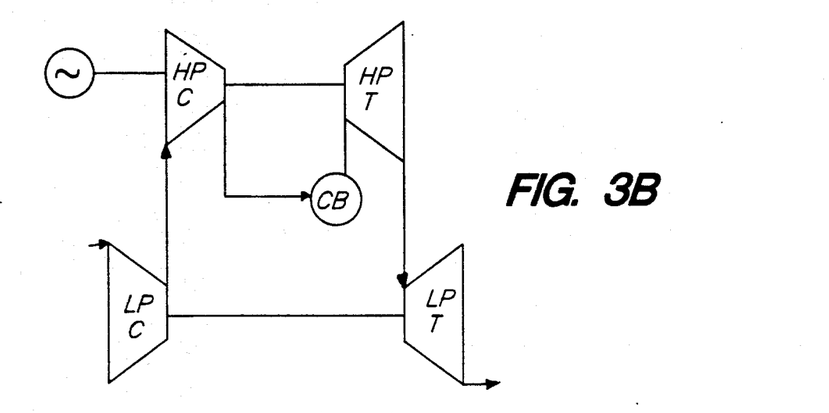

The mechanical arrangement of the engine can take several forms in addition to the angularly offset spool configuration shown in FIG. 1. FIG. 3a shows an in-line spool configuration, and FIG. 3b depicts schematically a parallel spool arrangement. These latter configurations are considered to fall within the general scope of the invention.

With similar component technology and turbine life, an engine according to the invention of some 400 KW which would achieve 30% thermal efficiency would compare favorably with 22% for a conventional design--both configured as "simple cycle" engines. For recuperated engines, the comparison would be about 40% and 35%, respectively.

A typical conventional design would have a single spool with a single stage compressor in this power range. No provisions for an intercooler can then be made. Consequently the required mass flow and hence the recuperator would be some 30% larger in volume.

The efficiency advantage of the disclosed design will be the greatest between about 100 KW and 1000 KW. Larger than 1000 KW could be considered, however, but the manufacturing cost of large radial wheels and their corresponding stators would eventually limit its use. Conversely, in the small sizes, the manufacture of low cost radial and centrifugal components is very well established in the production of turbochargers. The component efficiencies in these kinds of wheels are also intrinsically higher than for small axial-type compressor and turbine stages.

Twin spool engines normally have a separate power turbine on a separate shaft. The Rolls-Royce Tyne turboshaft/turboprop is an exception to this with the power take-off from the low pressure spool. Unlike such previous engine designs, the configuration according to the present invention extracts power from the *high pressure spool* with the express purpose of loading the radial in-flow turbine as much as possible and thereby utilize its characteristics of lowering the metal temperature of the wheel for a given combustion average temperature. Combining this feature with the previously mentioned advantage of a twin spool operation provides both additional temperature capability and higher pressure ratios, key factors to achieving good cycle efficiency.

The H.P. spool shall, according to the invention, always use a centrifugal compressor and a radial in-flow turbine. The L.P. spool could have components of both axial, mixed flow or radial/centrifugal type, with the latter being more suitable for the lower end of the contemplated power range.

The gas turbine of the present invention can have several configurations, among these, the following are mentioned:

(A) Simple cycle engine without intercooler or recuperator.

(B) Simple cycle engine with intercooler to improve power output and some efficiency improvement as well. This is at some expense of added complexity. Applications desiring combined power and heat (steam) would advantageously use configurations (A) or (B).

(C) Same as (B) but with the addition of a recuperator. This gives great flexibility in the market and will, for the recuperated version, provide substantial efficiency improvement. The added cost and complexity with the recuperator will be substantial, however.

(D) Similar to (C), but with component/cycle matching made optimal for the recuperated version and the achievement of the highest possible efficiency. When this version is operated without recuperator, but with intercooler, the efficiency will not be quite as good as (B). Base load electric power w/o any requirement for heating favours this optimized recuperated cycle.

EXAMPLE 1

In order to better illustrate the present invention, a calculational example is provided for a nominal 400 KW application using a twin spool gas turbine engine with intercooler.

Figure 4:
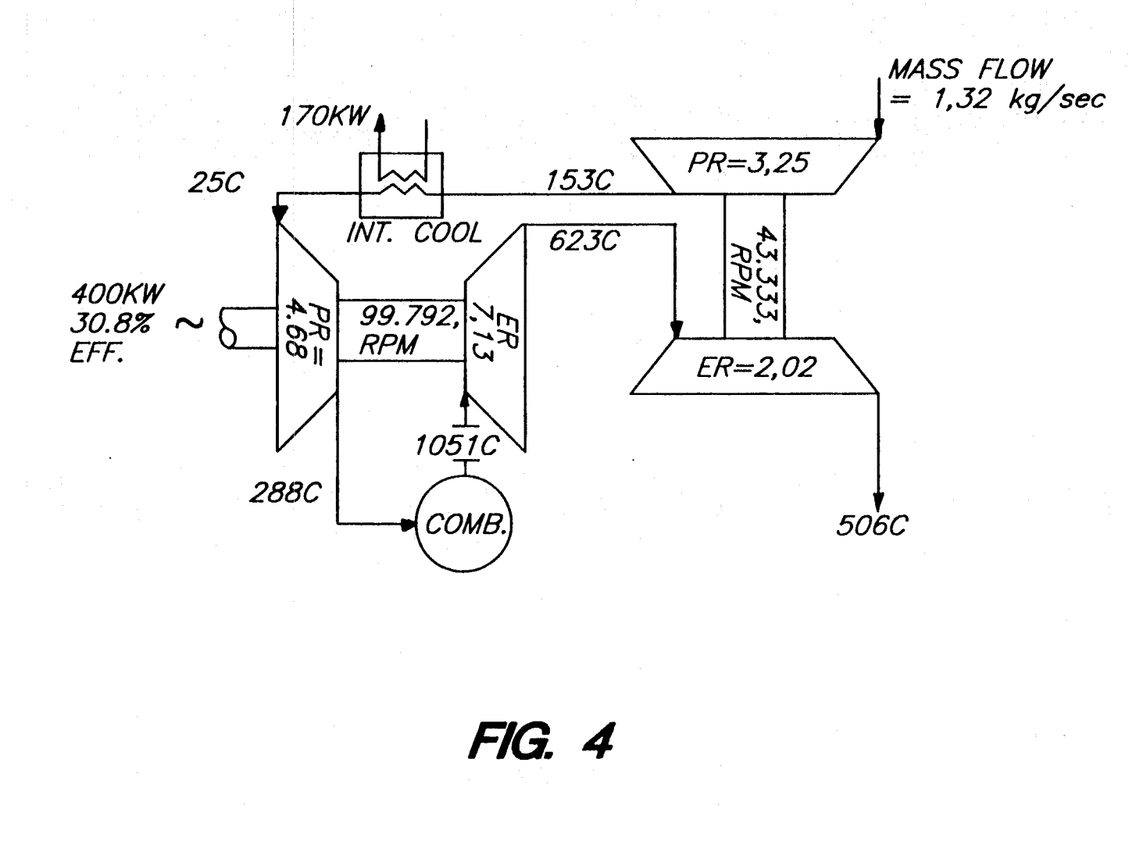
FIG. 4 is a cycle schematic showing the results of a calculational Example of a twin spool gas turbine engine in accordance with the present invention.

FIG. 4 presents the results of the calculations and shows that an overall efficiency of over 30% can be expected for the depicted simple cycle with intercooler ("SCI"), based on a combustor exit temperature of 1051° C.

The cycle shown in FIG. 4 and described below uses the same engine hardware for an engine both without and with a recuperator and achieves, as a consequence, a very desirable market flexibility.

If this cycle is turned into a Recuperated Cycle (RC), simply by adding a recuperator to the same engine hardware and making minor adjustments, the performance will be as follows:

| Power output | 375 KW |
|---|---|
| Shaft Thermal Efficiency | 40.1% |

The component assumptions for the SCI and RC are as follows:

| Overall Pressure Ratio | 15/1 |
|---|---|
| L.P. Comp. EFF. Isentropic | 82.8% |
| H.P. Comp. EFF. Isentropic | 80.4% |
| Overall Expansion Efficiency | |
| Total-Stat. Isen. | 87.0% |
| Recuperator Effectiveness | 85% |

EXAMPLE NO. 2

For comparison purposes, the calculations on the FIG. 4 cycle were repeated for the case of a lower combustor exit temperature. An initial rating using a 50° C. lower combustor exit temperature than the 1051° C. target rating level would yield 30.1% efficiency and 363 KW for the SCI, if the engine was matched for this situation. Under the same circumstances the RC would give 38.3% efficiency and 341 KW.

It will be apparent to those skilled in the art that various modifications and variations can be made in the above-described embodiments of the present invention without departing from the scope or spirit of the invention. Thus, it is intended that the present invention cover such modifications and variations provided they come within the scope of the appended claims and their equivalents.

What is claimed is:

1. A high-efficiency, twin spool gas turbine engine for driving an external load, the engine comprising:

a high pressure spool having shaft means, and a centrifugal compressor and a radial in-flow turbine mounted on said shaft means, said radial in-flow turbine having an expansion ratio of about 4/1 to 8/1;

means connected to said shaft means for driving essentially the entire external load from said high pressure spool shaft means;

combustion means associated with said high pressure spool for receiving compressed air from said centrifugal compressor, for combusting fuel using the compressed air, and for delivering the combustion gases and all the combustion heat energy to said radial in-flow turbine under all engine load conditions;

a low pressure spool having shaft means; and low pressure compressor means and low pressure turbine means mounted on said low pressure spool shaft means, said low pressure spool being rotatably independent from said high pressure spool and being essentially load-free;

first means for flow interconnecting said low pressure compressor means and said high pressure centrifugal compressor for supplying precompressed air thereto; and second means for flow interconnecting said high pressure radial in-flow turbine means and said low pressure turbine means for supplying partially expanded combustion gases thereto, wherein the expansion ratio across the radial in-flow turbine is greater than the expansion ratio across the low pressure turbine.

2. The twin spool gas turbine engine as in claim 1 further including intercooler means associated with said first flow connection means for cooling said pre-compressed air.

3. The twin spool gas turbine engine as in claim 2 wherein the pressure ratio of said low pressure compressor means is less than or equal to the pressure ratio of said high pressure centrifugal compressor.

4. The twin spool gas turbine engine as in claim 1 further including recuperator means for extracting heat values from said combustion gases exhausted from said low pressure turbine means and preheating the compressed air delivered from said high pressure centrifugal compressor to said combustion means.

5. The twin spool gas turbine engine as in claim 1 wherein said first and second flow interconnection means structurally support and orient said low pressure spool spool to be angularly offset from said high pressure spool supplying the external load by about 90°.

6. The twin spool gas turbine engine as in claim 1 wherein said combustion means includes a low $NO_x$ annular combustor having an angled internal cone.

7. The twin spool gas turbine engine as in claim 1 wherein said low pressure compressor means includes a single entry centrifugal compressor and said low pressure turbine means includes a mixed axial/radial flow turbine.

8. The twin spool gas turbine engine as in claim 1 wherein said low pressure compressor means includes a single entry centrifugal compressor and said low pressure turbine means includes an axial turbine.

9. The twin spool gas turbine engine as in claim 1 wherein said low pressure compressor means includes an axial compressor and said low pressure turbine means includes an axial turbine.

10. The twin spool gas turbine engine as in claim 1 wherein said external load driving means is operatively connected to said high pressure spool shaft means proximate said high pressure centrifugal compressor.

11. The twin spool gas turbine engine as in claim 1 wherein said first flow interconnecting means includes a manifold for receiving said precompressed air from said low pressure compressor means, said manifold having an increasing cross-sectional area in the flow direction for diffusing the compressed air.

12. The twin spool gas turbine engine as in claim 1 wherein said second flow interconnecting means includes diffuser means to receive and diffuse partially expanded combustion gases exhausted from said high pressure turbine prior to delivering the gases to said low pressure turbine means.

13. The twin spool gas turbine engine as in claim 1 further including bleed means associated with said first flow interconnecting means.

14. The twin spool gas turbine engine as in claim 1 wherein said radial in-flow turbine is sized to directly drive an external load of greater than or equal to about 100 KW and less than or equal to about 1000 KW.

15. The twin spool gas turbine engine as in claim 1 wherein said radial in-flow turbine is uncooled.

16. The twin spool gas turbine engine as in claim 1 wherein the expansion ratio across said radial in-flow turbine is greater than the expansion ratio across said low pressure turbine means.

17. The twin spool gas turbine engine as in claim 1 wherein the overall engine pressure ratio is between about 12/1 and 21/1.

18. A high efficiency gas turbine engine for direct-driving an external load, the engine comprising:
   a radial in-flow turbine for operation at a high-peripheral speed, said radial in-flow turbine having an inlet and an outlet;
   means for supplying high temperature, high pressure gases corresponding to an overall engine pressure ratio greater than about 12/1 to said radial in-flow turbine, said supply means including a low pressure rotating air compressor, a high pressure centrifugal air compressor flow connected to said low pressure rotating air compressor, and means for combusting fuel with compressed air from said high pressure centrifugal air compressor and delivering the combustion gases and all the combustion heat energy to said radial in-flow turbine inlet under all engine load conditions;
   means for loading said radial in-flow turbine including first shaft means for directly driving both said high pressure centrifugal air compressor and essentially the entire external load by said radial in-flow turbine; and
   low pressure turbine means for receiving gases from said radial in-flow turbine outlet, for extracting work therefrom, and for driving said low pressure rotating air compressor, said low pressure turbine means including a low pressure turbine and second shaft means directly connecting said low pressure turbine and said low pressure rotating air compressor, wherein said first shaft means and said second shaft means are rotationally independent for providing optimum aerodynamic efficiencies for the respective turbines and compressors associated therewith, thereby providing high engine efficiency, and wherein the expansion ratio across the radial in-flow turbine is greater than the expansion ratio across the low pressure turbine.

* * * * *